(12) United States Patent
Lacher et al.

(10) Patent No.: US 11,358,523 B2
(45) Date of Patent: Jun. 14, 2022

(54) METHOD FOR ASSISTING A DRIVER OF A MOTOR VEHICLE DURING AN OVERTAKING OPERATION, MOTOR VEHICLE, AND SYSTEM

(71) Applicant: AUDI AG, Ingolstadt (DE)

(72) Inventors: Peter Lacher, Gaimersheim (DE); Tilman Armbruster, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 16/956,801

(22) PCT Filed: Nov. 14, 2018

(86) PCT No.: PCT/EP2018/081248
§ 371 (c)(1),
(2) Date: Jul. 24, 2020

(87) PCT Pub. No.: WO2019/120774
PCT Pub. Date: Jun. 27, 2019

(65) Prior Publication Data
US 2021/0101526 A1    Apr. 8, 2021

(30) Foreign Application Priority Data
Dec. 20, 2017  (DE) .......................... 102017223431.8

(51) Int. Cl.
*B60Q 1/26*    (2006.01)
*B60Q 1/50*    (2006.01)
(Continued)

(52) U.S. Cl.
CPC ................. *B60Q 1/50* (2013.01); *B60Q 1/24* (2013.01); *G06T 7/50* (2017.01); *G06V 20/56* (2022.01);
(Continued)

(58) Field of Classification Search
CPC .... B60Q 1/50; B60Q 1/24; G06T 7/50; G06T 2207/30252; G06K 9/00791;
(Continued)

(56) References Cited

U.S. PATENT DOCUMENTS 9,809,165 B1 * 11/2017 Misu .......................... B60R 1/00
10,486,741 B2 * 11/2019 Kobayashi ............. B60Q 5/006
(Continued)

FOREIGN PATENT DOCUMENTS

DE    102004018681 A1    11/2005
DE    102004027695 A1    11/2005
(Continued)

OTHER PUBLICATIONS

International Search Report and Written Opinion of the International Searching Authority directed to related International Patent Application No. PCT/EP2018/081248, dated Mar. 21, 2019, with attached English-language translation obtained from World Intellectual Property Organization (WIPO); 21 pages.
(Continued)

*Primary Examiner* — Kerri L McNally
*Assistant Examiner* — Thang D Tran
(74) *Attorney, Agent, or Firm* — Sterne, Kessler, Goldstein & Fox P.L.L.C.

(57) ABSTRACT

The invention relates to a method for assisting a driver of a motor vehicle during an overtaking operation. The method includes determining vehicle data, which relate to a movement of the motor vehicle and determining an intention of the driver to overtake another vehicle using the vehicle data. The method further includes determining a position of the motor vehicle and providing environment data for the position of the motor vehicle. The environment data relate to stationary objects in an environment of the motor vehicle. The method further includes deriving a visual range from the
(Continued)

Figure 1:
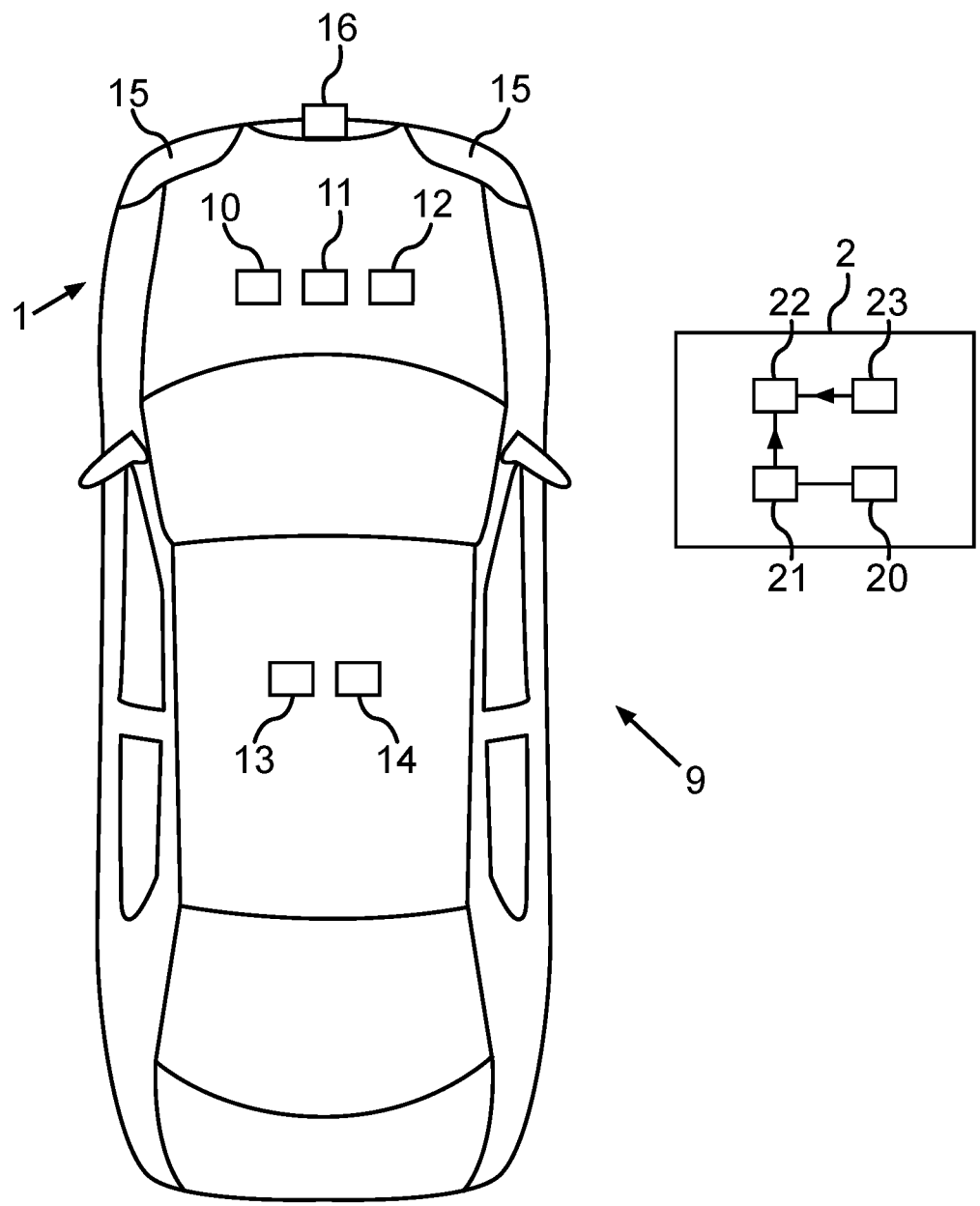

environment data, and, only if the intention of the driver to overtake has been determined either projecting a warning onto a roadway region in the environment or illuminating an overtaking lane by a headlight of the motor vehicle, depending on the visual range.

13 Claims, 2 Drawing Sheets

(51) Int. Cl.
*G06T 7/50* (2017.01)
*B60Q 1/24* (2006.01)
*G08G 1/16* (2006.01)
*G06V 20/56* (2022.01)
*G06V 20/59* (2022.01)
*H04N 5/247* (2006.01)

(52) U.S. Cl.
CPC .......... *G06V 20/597* (2022.01); *G08G 1/164* (2013.01); *G08G 1/167* (2013.01); *G06T 2207/30252* (2013.01); *H04N 5/247* (2013.01)

(58) Field of Classification Search
CPC .... G06K 9/00845; G08G 1/164; G08G 1/167; H04N 5/247; G06V 20/597; G06V 20/56
USPC ......................................................... 340/468
See application file for complete search history.

(56) References Cited

U.S. PATENT DOCUMENTS

| | | | |
|---|---|---|---|
| 10,643,470 B2 | 5/2020 | Profendiner | |
| 2002/0169544 A1* | 11/2002 | Hashida | G01S 19/50 701/468 |
| 2005/0246096 A1 | 11/2005 | Bracht et al. | |
| 2008/0055192 A1* | 3/2008 | Nagano | G02B 27/01 345/7 |
| 2009/0062992 A1 | 3/2009 | Jacobs et al. | |
| 2011/0022247 A1* | 1/2011 | Stahlin | G08G 1/096783 701/1 |
| 2012/0044090 A1* | 2/2012 | Kahler | B60Q 1/50 340/905 |
| 2013/0113633 A1* | 5/2013 | Pilutti | G08G 1/096783 340/905 |
| 2013/0226406 A1* | 8/2013 | Ueda | B62D 1/28 701/41 |
| 2013/0238194 A1* | 9/2013 | Ueda | B62D 15/025 701/42 |
| 2014/0236483 A1* | 8/2014 | Beaurepaire | G08G 1/168 701/533 |
| 2015/0084756 A1* | 3/2015 | Mori | B60Q 3/14 340/435 |
| 2015/0239396 A1* | 8/2015 | Gjikokaj | B60Q 9/008 340/461 |
| 2015/0254515 A1* | 9/2015 | Zobel | G06K 9/00818 382/104 |
| 2015/0262484 A1* | 9/2015 | Victor | G09B 19/167 701/1 |
| 2015/0266486 A1* | 9/2015 | Silvlin | B60W 30/18163 701/70 |
| 2016/0023592 A1* | 1/2016 | Foltin | B60Q 1/085 701/49 |
| 2016/0207443 A1* | 7/2016 | Widdowson | B60Q 1/0011 |
| 2016/0229395 A1* | 8/2016 | Schmüdderich | G08G 1/161 |
| 2016/0257341 A1* | 9/2016 | Lavoie | B60W 10/18 |
| 2016/0318511 A1* | 11/2016 | Rangwala | B60W 10/20 |
| 2017/0116860 A1* | 4/2017 | Tan | G08G 1/163 |
| 2017/0218871 A1* | 8/2017 | DeCia | H04L 12/4625 |
| 2017/0278390 A1* | 9/2017 | Zydek | G08G 1/096716 |
| 2018/0081371 A1* | 3/2018 | Bar-Tal | G05D 1/0246 |
| 2018/0118099 A1* | 5/2018 | Kunii | B60K 35/00 |
| 2018/0141588 A1* | 5/2018 | Shimizu | B62D 15/0265 |
| 2018/0365996 A1* | 12/2018 | Profendiner | G08G 1/096716 |
| 2019/0096244 A1* | 3/2019 | Guruva Reddiar | G08G 1/096775 |
| 2019/0098471 A1* | 3/2019 | Rech | H04W 4/02 |

FOREIGN PATENT DOCUMENTS

| | | | | |
|---|---|---|---|---|
| DE | 102009009472 | * | 8/2010 | ............ G08G 1/16 |
| DE | 102009009472 A1 | | 8/2010 | |
| DE | 102009009473 A1 | | 8/2010 | |
| DE | 102013219447 A1 | | 3/2015 | |
| DE | 102013222467 A1 | | 5/2015 | |
| DE | 102014009253 A1 | | 12/2015 | |
| DE | 102014214649 A1 | | 1/2016 | |
| DE | 102015015944 A1 | | 6/2017 | |
| EP | 2030838 A2 | | 3/2009 | |
| WO | WO 2006/037360 A1 | | 4/2006 | |

OTHER PUBLICATIONS

International Preliminary Report on Patentability directed to related International Patent Application No. PCT/EP2018/081248, dated June 23, 2020, with attached English-language translation; 16 pages.

\* cited by examiner

METHOD FOR ASSISTING A DRIVER OF A MOTOR VEHICLE DURING AN OVERTAKING OPERATION, MOTOR VEHICLE, AND SYSTEM

TECHNICAL FIELD

The invention relates to a method for assisting a driver of a motor vehicle during an overtaking operation. Another aspect of the invention relates to a motor vehicle having a driver assistance system. The invention also includes a system for assisting during an overtaking operation, which includes a motor vehicle and a vehicle-external server device.

BACKGROUND

The lighting region of a headlight can be adapted to a traffic situation. For this purpose, for example, headlight systems having an adjustable lighting region are used. The higher the resolution of a headlight, the more precisely the lighting region can be adapted to the traffic situation. In this context, different systems for high-resolution headlights are known. A high-resolution headlight can have, for example, a matrix illuminant, an arrangement of micromirrors, an arrangement of liquid crystals, or a laser scanner.

For example, DE 10 2014 214 649 A1 discloses a method for aligning a lighting region of a headlight of a vehicle as a function of the surroundings of the vehicle. An optimal alignment of the lighting region of the headlights can result in a shadow region surrounding an oncoming vehicle and a vehicle-free region of the surroundings next to the shadow region being illuminated by the headlights to a maximum extent.

Using high-resolution headlights, light signals can still be projected onto a road. This is known, for example, from DE 10 2009 009 473 A1, which provides a method for assisting a driver of a vehicle and other road users. It is analyzed whether another road user presents a risk of collision for the vehicle and, if necessary, projects a light signal from the vehicle onto the roadway, which alerts the other road user to the risk of a collision. If, for example, it is determined during an overtaking operation that there is no risk of collision, no light sign is initially projected onto the road. If it turns out that the vehicle has started the overtaking operation too soon while maintaining the speeds of all the vehicles involved, a light signal is projected onto the road in front of other vehicles in order to induce the other road users to brake.

DE 10 2014 009 253 A1 relates to a method for controlling a light distribution of a headlight of an own vehicle. The light distribution of a headlight can be adjusted as a function of a trajectory of a vehicle. The trajectory can be created, for example, taking into account calculated maneuvering probabilities of vehicles. For example, only one trajectory of the vehicle is forecast for a maneuver that is most likely to apply. Depending on the trajectory determined in this way, the light distribution of the headlights can then be adjusted. An overtaking or a lane change can be detected as a maneuver, for example.

BRIEF DESCRIPTION OF THE DRAWINGS/FIGURES

FIG. 1 schematically illustrates a system for assisting during an overtaking operation having a motor vehicle and a vehicle-external server device, according to some embodiments of this disclosure.

Figure 2:
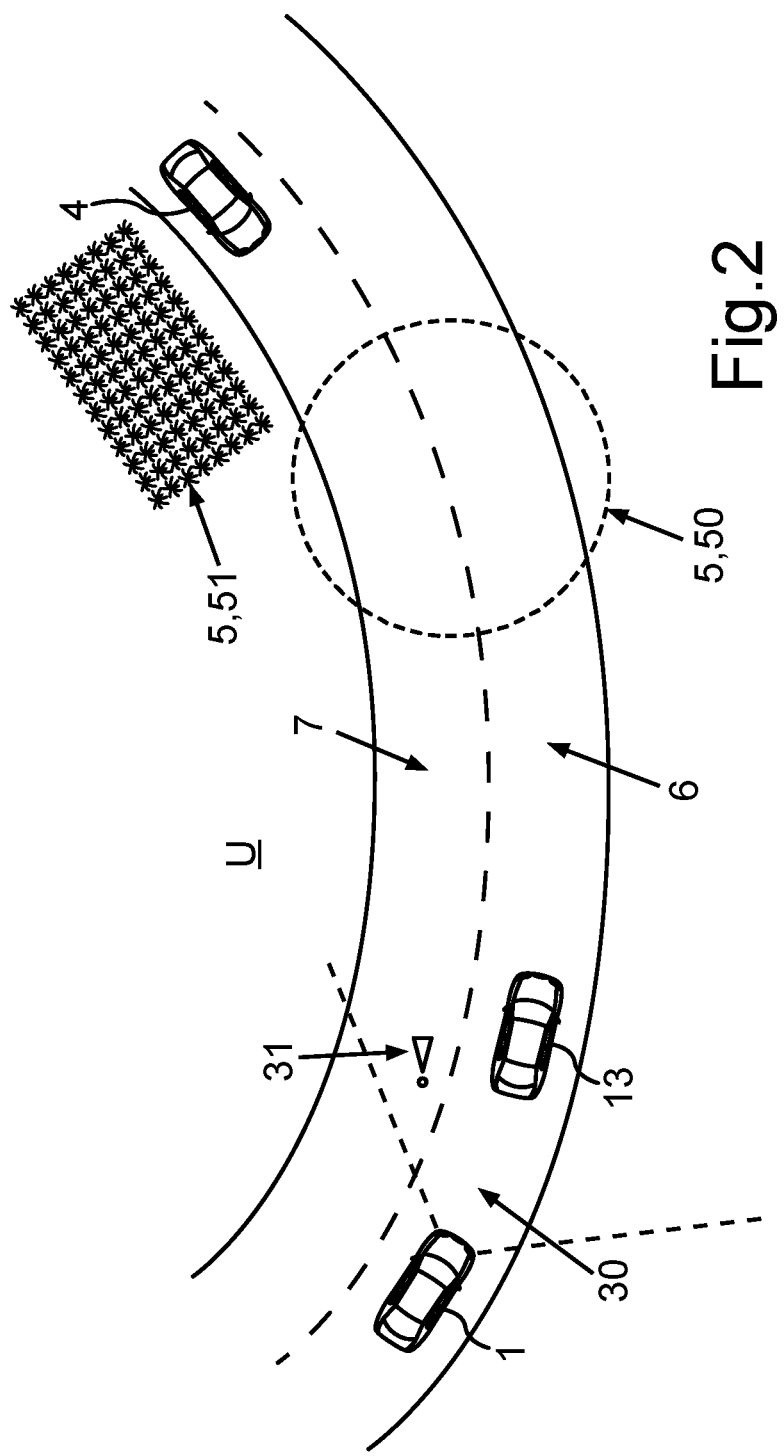

FIG. 2 illustrates an example method based on a potential overtaking operation, according to some embodiments of this disclosure.

DETAILED DESCRIPTION

It is an object of the present invention to make possible a higher safety level during an overtaking operation of a motor vehicle.

This object is achieved according to the invention by the subject matter of the independent patent claims. Advantageous embodiments with expedient developments are the subject matter of the dependent claims.

A first aspect of the invention relates to a method for assisting a driver of a motor vehicle during an overtaking operation. First of all, vehicle data relating to a movement of the motor vehicle are determined. The vehicle data can, for example, indicate a speed, an acceleration, the setting of a turn signal of the motor vehicle, a relative speed to another vehicle or the recognition of a shoulder glance by the driver of the motor vehicle. An intention of the driver to overtake the other vehicle is determined on the basis of this vehicle data. In particular, according to a predefined, or adaptable, or teachable rule, a probability value can be determined from the vehicle data, which indicates the probability with which the driver will overtake the other vehicle in the future. If this probability value exceeds a predefined probability limit value, the driver's intention to overtake the other vehicle can be assumed.

A position of the motor vehicle is then determined. This is done, for example, with the aid of a receiver for a navigation satellite system (in particular GPS, Galileo, Baidu, or Glonass) or via a mobile network. Some embodiments of the invention provide that the position is only determined if the driver's intention to overtake the other vehicle has been determined.

Subsequently, environment data for the position of the motor vehicle are provided, where the environment data relate to stationary objects in an environment of the motor vehicle. In other words, the environment data can be adapted to the previously determined position of the motor vehicle. Stationary objects in the environment of the motor vehicle can be, for example, walls, trees, bushes, forests, crests, buildings, or others, which is suitable for obscuring the driver's view of a portion of the route lying in front of the motor vehicle. The environment data can be provided, for example, by a receiving unit which is designed to receive the environment data from a vehicle-external server device. This reception can take place, for example, via the mobile network. A visual range is derived from the environment data. For example, the visual range is derived from the environment data by a computing unit of the motor vehicle. In some embodiments of the invention, the step of providing the environment data and/or deriving the visual range can only be carried out if the driver's intention to overtake the other vehicle has been detected.

In a further step, only when the driver's intention to overtake has been determined, depending on the visual range, either a warning notice is projected onto a roadway region in the environment or an overtaking lane is illuminated by a headlight of the motor vehicle. In other words, if the driver's intention to overtake has been determined, the headlight of the motor vehicle either projects the warning or illuminates the overtaking lane. In the example mentioned above, the projection or illumination only takes place if the probability value for the following overtaking operation is greater than the predefined probability limit value.

According to one embodiment, the aforementioned steps of the method can be carried out entirely in a motor vehicle or by a motor vehicle. In this case, the motor vehicle has respective means for carrying out the individual steps.

In another embodiment it is provided that the steps of providing the environment data and deriving the visual range are carried out in a vehicle-external server device and the visual range is received by the motor vehicle from the server device. For example, the environment data can be provided in the vehicle-external server device by a storage unit. The server device then transmits the visual range derived from the environment data to the motor vehicle. For example, the receiving unit of the motor vehicle can receive the visual range from the server device. This transmission preferably takes place via the mobile network.

A further development provides that the environment data is at least partially collected by the server device from a plurality of further motor vehicles. In other words, the environment data from a vehicle fleet, namely the majority of other motor vehicles, are received and collected. The visual range can either be derived directly from the plurality of further motor vehicles when they receive respective environment data. Alternatively, the respective environment data of the plurality of further motor vehicles can first be collected and then jointly evaluated with respect to the visual range. In particular, a plurality of values for the visual range are derived from the respective environment data of the respective motor vehicles from the plurality of further motor vehicles. This plurality of values for the visual range can then be combined into the visual range, which is transmitted to the motor vehicle. The summary is carried out in particular by averaging, regression, or statistical evaluation methods. This can reduce errors in determining the visual range.

According to a development, the environment data include camera images of a respective front camera of the motor vehicle and/or the majority of other motor vehicles. Thus, for example, respective camera images from the plurality of other motor vehicles are collected. The visual range can be derived from these camera images using a predefined rule. By deriving the visual range from the camera images of the plurality of further motor vehicles, errors in the image evaluation of a camera image of the motor vehicle can be avoided. In addition, camera images of the plurality of motor vehicles which were recorded during the day can preferably be used to determine the visual range. For this purpose, the camera images can be selected based on an image brightness. For example, only those camera images of the plurality of further motor vehicles are selected for deriving the visual range whose average luminance exceeds a predefined brightness value. In this way, the visual range for the position of the motor vehicle can also be determined at night. Furthermore, this embodiment ensures a higher reliability when deriving the visual range compared to deriving the visual range from a camera image of a front camera of the motor vehicle. According to this embodiment, the problem is solved that the driver of the motor vehicle, particularly at night, can hardly estimate the visual range himself. For example, the stationary objects in the environment of the motor vehicle could cover oncoming motor vehicles. In particular at night, when the driver of the motor vehicle does not perceive the headlights of oncoming motor vehicles, this can lead to the incorrect assumption by the driver that overtaking is possible without risk.

The camera images can represent the stationary objects in the environment of the motor vehicle. In other words, the stationary objects in the environment can be detected and/or localized using the camera images. In particular, the camera images are used to determine, by means of a predefined algorithm, how far the portion of the route lying in front of the motor vehicle can be seen and how the visual range is output. In other words, a point is sought in the camera images up to which the portion of the route lying in front of the motor vehicle can be seen. This point can be referred to as the "end of sight." The distance to this point can be considered the visual range.

A further development provides that the visual range is derived from the camera images by means of a machine learning device. For example, the machine learning device can be designed to recognize the end points of the view. For example, the machine learning device will be taught this using test images. When teaching the machine learning device, it can determine a rule for recognizing the end point of the view. As a result, the visual range can be determined particularly reliably.

A further development provides that, depending on the visual range, the warning is then projected onto the roadway region if the visual range is less than a visual limit value, and the overtaking lane is illuminated if the visual range is greater than the visual limit value, where the visual limit value is either predefined or determined. The visual limit value is in particular predefined or is determined such that overtaking is possible without risk if the visual range is greater than the visual limit value. In this way, the driver can be assisted during the overtaking operation in such a way that he is notified when the visual range is not sufficient to safely overtake. In addition, the driver can be assisted so that on the one hand the lighting of the overtaking lane shows him that the visual range is sufficient to safely overtake and on the other hand a good view of the overtaking lane is provided.

The visual limit value is preferably determined as a function of a speed of the motor vehicle and/or a speed of the other vehicle. For example, the visual limit value is determined to be greater, the greater the speed of the motor vehicle and/or the speed of the other vehicle. This ensures that the visual limit value is sufficiently large at high speeds and at the same time the visual limit value is not selected to be unnecessarily large at low speeds.

According to a further development, the visual range can be derived at least partially from map data which are part of the environment data. The visual range can thus be derived, for example, from one or more camera images, from the map data, or from the map data and one or more camera images. The map data can relate, for example, to permanently stationary objects in the environment of the motor vehicle. Buildings, walls, and houses are examples of permanently stationary objects. Objects that are not permanently stationary are, for example, bushes, fields, in particular maize or hops. The stationary objects are thus divided into permanently stationary objects and non-permanently stationary objects. Forests or individual trees can be assigned to either permanently stationary objects or non-permanently stationary objects, depending on the individual case. The non-permanently stationary objects in the environment of the motor vehicle can be determined on the basis of the camera images. In addition, the camera images can also be used to detect permanently stationary objects. The accuracy can be further improved by determining the visual range using map data. Accuracy is further improved if the visual range is determined both from map data and from the camera images.

In a further embodiment, the visual range can be derived at least partially from height data and/or slope data, which are part of the map data, a restriction of the visual range being determined by a vertical course of a road traveled by the motor vehicle. For example, the visual range can be restricted by a crest or a hill lying in front of the motor vehicle. In this case, the driver of the motor vehicle would not be able to see a motor vehicle coming from behind the hill or behind the crest. Therefore, by projecting the warning, the driver can be informed that the visual range due to the hill or the crest is not sufficient for overtaking. This results in increased safety for the movement of the motor vehicle.

The driver's intention to overtake the other vehicle can be determined by setting a turn signal of the motor vehicle. Alternatively or additionally, the intention of the driver to overtake the other vehicle can be determined using an interior camera of the motor vehicle, in particular by recognizing a shoulder glance. In other words, the driver's intention can be determined, for example, when the driver indicates by the setting of the turn signal that he wants to swerve behind the other vehicle. Additional variables can be used to determine the driver's intention to overtake the other vehicle. For example, the speed of the motor vehicle and the other vehicle and/or a relative speed between the motor vehicle and the other vehicle can be used to determine the intention.

A second aspect of the invention relates to a motor vehicle having a driver assistance system for assisting during an overtaking operation, including a first determination device for determining vehicle data relating to a movement of the motor vehicle, a second determination device for determining an intention of a driver of the motor vehicle to overtake another vehicle, on the basis of the vehicle data, a position determination device for determining a position of the motor vehicle, a computing unit for providing environment data for the position of the motor vehicle, where the location data relate to stationary objects in an environment of the motor vehicle. In addition, the computing unit is designed to derive a visual range from the environment data. Furthermore, the motor vehicle includes a headlight for projecting a warning notice onto a roadway region in the environment and for illuminating an overtaking lane by a headlight of the motor vehicle, where the computing unit is designed either to project the warning notice or to illuminate the overtaking lane depending on the visual range and only if the driver's intention to overtake has been determined. In other words, the computing unit is designed to only specify the projection or the illumination when the driver's intention to overtake has been determined.

The motor vehicle is preferably a motor vehicle, for example a passenger car or a truck.

The motor vehicle can include an internal combustion engine and/or an electrical machine as a drive.

The position determination device can be designed, for example, as a receiver for a navigation satellite system, for example as a GPS receiver. The computing unit can be designed to receive the environment data for provision from a receiving unit of the motor vehicle. In other words, the environment data can be received by the receiving unit from a server device and then made available by the computing unit for further processing.

In particular, the motor vehicle is set up to carry out a method according to any of the preceding claims.

Another aspect of the invention relates to a system for assisting during an overtaking operation having a motor vehicle and a vehicle-external server device. The vehicle-external server device is in particular stationary.

The motor vehicle of the system includes a first determination device for determining vehicle data relating to a movement of the motor vehicle, a second determination device for determining an intention of the driver of the motor vehicle to overtake another vehicle, based on the vehicle data, and a positioning unit for determining a position of the motor vehicle. Furthermore, the motor vehicle includes a headlight for projecting a warning notice onto a roadway region in the environment and for illuminating an overtaking lane.

The system further includes a computing unit for providing environment data for the position of the motor vehicle, where the environment data relate to stationary objects in an environment of the motor vehicle, and for deriving a visual range from the environment data. In addition, the computing unit is designed to specify either the projection of the warning or the lighting of the overtaking lane as a function of the visual range and only if the driver's intention to overtake has been determined. The computing unit can be located entirely in the motor vehicle or completely in the server device. However, the computing unit is preferably arranged partly in the motor vehicle and partly in the server device. For example, the computing unit is composed of a first computing part and a second computing part, the first computing part being arranged in the motor vehicle and the second computing part being arranged in the server device. The system can be set up to carry out a method according to one or more of the above-mentioned embodiments. In addition, the motor vehicle can have a receiving unit, for example in order to receive the environment data and/or the visual range from the server device. The second computing part is preferably designed to provide the environment data and to derive the visual range from the environment data. The first computing part is preferably designed to receive the visual range derived from the environment data and to use it to specify either the projection of the warning or the illumination of the overtaking lane.

The invention also includes the combinations of the described embodiments.

The invention also includes refinements of the method according to the invention, which include features such as those that were previously described in connection with the refinements of the motor vehicle according to the invention. For this reason, the corresponding refinements of the method according to the invention are not described again herein.

Exemplary embodiments of the invention are described below. In the drawings:

FIG. 1 schematically shows a system for assisting during an overtaking operation having a motor vehicle and a vehicle-external server device; and FIG. 2 shows an example of the method based on a potential overtaking operation.

The exemplary embodiments explained below are preferred embodiments of the invention. In the exemplary embodiments, the components of the embodiments that are described each constitute individual features of the invention to be considered independently of one another, which individually also further develop the invention independently of one another and are thus also to be considered part of the invention both individually and in a combination that is different from the combination described. In addition, the embodiments described can also be supplemented by further features of the invention, which have already been described.

In the figures, functionally identical members are each denoted with the same reference signs.

FIG. 1 shows, extremely schematically, a motor vehicle 1 and a vehicle-external server device 2, each of which is part of a system 9 for assisting a driver during an overtaking operation. The server device 2 is in particular stationary. In other words, the server device 2 is not part of a vehicle. The server device 2 and the motor vehicle 1 can be designed to communicate with one another. The motor vehicle 1 is set up to receive data from the server device 2. For example, the communication or reception of the data takes place via a mobile network, preferably via LTE, UMTS, GPRS, or GSM. However, any other, in particular wireless, communication link between the vehicle-external server device 2 and the motor vehicle 1 is also possible. According to FIG. 1, the motor vehicle has a receiving unit 14, which is designed to receive the data from the server device 2. For example, the receiving unit 14 is a mobile radio device.

The motor vehicle 1 has a first determination device 10 for determining vehicle data. The vehicle data relate to a movement of the motor vehicle 1. For example, the vehicle data can include a speed of the motor vehicle 1, a relative speed between the motor vehicle 1 and another vehicle 3, an acceleration of the motor vehicle 1, the actuation of a turn signal of the motor vehicle 1, and/or data relating to the driver of the motor vehicle 1. The data relating to the driver of the motor vehicle 1 can in particular indicate the direction in which he is looking and/or whether he is performing a shoulder glance to the side or to the rear.

The vehicle data are transmitted from the first determination device 10 to a second determination device 11, which is designed to determine an intention of the driver of the motor vehicle 1 to overtake another vehicle 3 on the basis of the vehicle data. In particular, the second determination device 11 determines a probability value which indicates the probability with which the driver wants to overtake the other vehicle 3. If this probability value is greater than a predefined probability limit value, it can be assumed that the driver has the intention to overtake the other vehicle 3. In other words, the existence of the intention is determined precisely when the probability value is greater than the predefined probability limit value.

A position determination device 13 of the motor vehicle 1 is designed to determine a position of the motor vehicle 1. In the present case, the position determination device 13 is a receiver for a signal from a navigation satellite system. For example, the position determination device 13 can be designed to receive a signal from the GPS, Glonass, Baidu, and/or Galileo satellite system. Using the satellite signal, the position determination device 13 can determine or ascertain the position of the motor vehicle 1.

In the present embodiment, the motor vehicle 1 then transmits its position to the vehicle-external server device 2 by means of the receiving unit 14. In the vehicle-external server device 2, environment data for the position of the motor vehicle 1 are then provided, the environment data relating to stationary objects 5 in an environment U of the motor vehicle 1. Examples of such stationary objects 5 are hills or crests 50, trees or forests, bushes or hedges, crops such as maize (maize fields 51), or hops, buildings, walls, or houses. The environment data can include different types of data, this will be explained in more detail below. The computing unit 22 derives a visual range from the environment data. This visual range is specific to the previously determined position of the motor vehicle 1. The visual range represents how far a free field of vision is for the driver of the motor vehicle 1 along a road 6 traveled by the motor vehicle 1. In other words, the visual range indicates how far the driver's view in the direction of travel along the road 6 is not obscured by stationary objects 5.

This visual range is in turn transmitted from the server device 2 to the motor vehicle 1. In the motor vehicle 1, the computing unit 12 uses the visual range to decide whether either a warning 31 is to be projected onto a roadway region of the street 6 or whether an overtaking lane 7 of the street 6 is to be illuminated. In the case of a two-lane road 6, the overtaking lane 7 can in particular be the oncoming lane. The computing unit 12 can transmit the result of this decision to the headlights 15 of the motor vehicle 1. In other words, the headlights 15 are controlled accordingly by the computing unit 12 so that they either project the warning 31 onto the roadway region of the street 6 or illuminate the overtaking lane 7.

The headlights 15 are preferably high-resolution headlights, which in particular can resolve at least 200, 500, 1000, or 2000 pixels. For example, the headlights 15 include a matrix illuminant, an arrangement of micromirrors, an arrangement of liquid crystals, or a laser scanner.

The provision of the environment data by the computing unit 22 of the server device 2 will now be explained in more detail. According to the present exemplary embodiment, the server device 2 includes a map database 23 and an image database 21. Map data can be stored or saved in the map database 23. The map data can include, for example, respective positions of the permanently stationary objects 5 that are permanently stationary. Examples of permanently stationary objects are buildings, walls, hills, and crests 50. Camera images can be stored or saved in the image database 21. The camera images can be recorded by a plurality of motor vehicles and transmitted to the server device 2. The server device 2 thus receives the respective camera images from the plurality of motor vehicles. For example, the server device 2 includes a receiving unit 20 for this purpose. The camera images can be collected, classified, and assigned to a respective recording position by the receiving unit 20. The recording position can describe the position in which the respective camera image was recorded. In some embodiments of the invention, the receiving unit 20 can also be designed to extract an end point of the view from the respective camera images. This end point of view can also be referred to as the "end of sight." Here, a predefined rule for image evaluation is used to extract from the respective camera images about how far the visual range in the direction of travel is in the respective recording position. This end point of the view can be stored in the image database 21 for the different recording positions and the different camera images from the plurality of motor vehicles. This results in a respective value for the end point of the view from each of the camera images. In other embodiments, the respective images of the plurality of motor vehicles can be stored in the image database 21. In further embodiments, both the camera images and the different values for the end of the visual range are stored.

The computing unit 22 can provide the map data from the map database 23 and/or the camera images from the image database 21 and/or the different values for the end point of the view from the image database 21 as the environment data. In particular, only those values for the end point of the view or those camera images are provided from the image database 21, the recording position of which corresponds to the position of the motor vehicle 1.

The visual range can thus be derived by the computing unit 22 on the basis of the map data, on the basis of the camera images, and/or on the basis of the values for the end point of the view. If the visual range is at least partially derived from the camera images, this can be done by extracting the end point of the view and then determining the visual range therefrom.

The extraction of the end point of the view can preferably be carried out by a machine learning device. In this case, the computing unit and/or the receiving unit 20 can optionally have such a machine learning device. The machine learning device can be taught in, for example, by providing it with a large number of test images for which the end point of the view is known. From this, the machine learning device can derive or refine the rule for extracting the end point of the view. The machine learning device can be continuously improved even during operation. In this way, the determination of the end point of the view can always be more precise.

Each motor vehicle from the plurality of motor vehicles can have a front camera 16. Such a front camera 16 is shown here for the motor vehicle 1 in FIG. 1. In particular, only those camera images from the majority of motor vehicles that were recorded during the day are received. For example, the camera images are selected according to their time or their luminance.

Of course, motor vehicle 1 can also be part of the majority of motor vehicles. In this case, the motor vehicle 1 can transmit camera images, which are recorded by the front camera 16, to the server device 2 or the receiving unit 20. In particular, in addition to the camera images, a respective recording position for each of the camera images is also transmitted.

When determining the end point of the view, averaging or regression can be performed. For example, the end point of the view is extracted from a plurality of camera images which have been received from different motor vehicles of the plurality of motor vehicles. A statistical value for the end point of the view can then be determined therefrom using a method for averaging or error calculation. The visual range can be derived particularly precisely from this statistical value.

Finally, the present method is to be illustrated using a concrete example. According to FIG. 2, the motor vehicle 1 is on the road 6. It is determined as part of the vehicle data that the motor vehicle 1 has a positive relative speed in relation to the other vehicle 3, i.e. is faster than the other vehicle 3. In addition, it is determined as part of the vehicle data that the motor vehicle 1 is accelerating, i.e. increasing its speed. A probability value is calculated from this vehicle data, which indicates the probability with which the driver of the motor vehicle 1 would like to overtake the other vehicle 3. In the present case, this probability value is greater than a predefined probability limit value. It is therefore assumed that the driver of the motor vehicle 1 has the intention to overtake the other vehicle 3.

The motor vehicle 1 then determines its position. This position is transmitted by the motor vehicle 1 to the server device 2. In the server device 2, the visual range for the motor vehicle 1 is derived from the environment data by the computing unit 22. In the present example, the environment U is dark (at night), therefore a corn field 51 and a crest 50 are not visible to the driver of the motor vehicle 1. An oncoming vehicle 4 is covered by stationary objects 5, namely the crest 50 and the corn field 51 in the present case. The driver of motor vehicle 1 could therefore incorrectly assume that oncoming traffic on the road 6 is not coming and that he can overtake safely.

On the basis of the respective end points of the view which have been extracted from different camera images of other motor vehicles for the position of the motor vehicle 1, the computing unit 22 derives a visual range which is restricted by the vehicle-external objects 5, namely the corn field 51 and the crest 50. These different camera images were recorded during the day by a respective front camera 16 of the other motor vehicles. Therefore, the corn field 51 and the crest are easily recognizable. In addition, the computing unit 22 derives a visual range from the map data, which in turn contains height information, which is limited by the crest 50. In other words, the computing unit 22 recognizes on the basis of the height data or the map data that the visual range in the position of the motor vehicle 1 is restricted by the crest 50. The two values for the visual range, which were determined on the basis of the map data and the camera images, are combined into a common value for the visual range and transmitted to the motor vehicle 1.

In the motor vehicle 1, the computing unit 12 recognizes that the received value for the visual range is smaller than a predefined visual limit value. In an alternative exemplary embodiment, the computing unit 12 in the motor vehicle 1 recognizes that the visual range is smaller than a visual limit value previously determined on the basis of the speed of the motor vehicle 1. In other words, the visual limit value can either be predefined or determined in the course of the present method. In particular, the visual limit value is determined on the basis of the speed of the motor vehicle 1, a speed of the other vehicle 3, or on the basis of any other data.

Since the visual range is smaller than the visual limit value, the computing unit 12 decides that overtaking the other vehicle 3 is not safe. For this reason, the headlights 15 of the motor vehicle 1 are controlled by the computing unit 12 in such a way that a warning 31 is projected onto the road 6, in the present case onto the overtaking lane 7. The warning notice 31 can include, for example, a symbol, in particular an exclamation mark. In the present case, a lighting region 30 of the headlights 15 is not changed compared to normal operation, since the overtaking of the other vehicle 3 is not possible without risk or the visual range is smaller than the visual limit value.

If the visual range is greater than the visual limit value, it can be decided that the overtaking of the other vehicle 3 is non-hazardous, at least with regard to the visual range. In this case, the lighting region 30 of the headlights 15 can be shifted such that the overtaking lane 7 is illuminated. In other words, the lighting region 30 is shifted in the direction of the overtaking lane 7 compared to normal operation. In this case, at least one headlight 15 of the motor vehicle 1 is controlled in such a way that this displacement of the lighting region takes place. If the visual range is greater than the visual limit value, the warning 31 is not projected.

In summary, the exemplary embodiments show how the safety level can be increased during an overtaking operation. In particular, it shows how a driver can be informed at night whether the visual range is sufficient for overtaking. For this purpose, the visual range can be determined on the basis of camera images which were taken during the day by another motor vehicle.

The invention claimed is:

1. A method for assisting a driver of a motor vehicle during an overtaking operation, the method comprising:
   determining vehicle data relating to a movement of the motor vehicle;
   determining an intention of the driver to overtake another vehicle using the vehicle data;
   determining a position of the motor vehicle; and
   in response to determining the intention of the driver to overtake the other vehicle, either projecting a warning onto a roadway region in an environment of the motor vehicle or illuminating an overtaking lane by a headlight of the motor vehicle, depending on a visual range, wherein the visual range is derived from environment data, and wherein the environment data are for the position of the motor vehicle and relate to stationary objects in the environment of the motor vehicle.

2. The method according to claim 1, wherein the environment data is provided by a vehicle-external server device and the visual range is derived in the vehicle-external server device and the method further comprises receiving the visual range by the motor vehicle from the vehicle-external server device.

3. The method according to claim 2, wherein the environment data are at least partially collected by the server device from a plurality of further motor vehicles.

4. The method according to claim 3, wherein the environment data comprise camera images of a respective front camera of the motor vehicle or the plurality of further motor vehicles.

5. The method according to claim 4, wherein the visual range is derived from the camera images by using a machine learning device.

6. The method according to claim 1, wherein:
the projecting the warning onto the roadway region occurs in response to the visual range being smaller than a visual limit value,
the illuminating the overtaking lane occurs in response to the visual range being greater than the visual limit value, and
the visual limit value is either predefined or determined.

7. The method according to claim 6, wherein the visual limit value is determined as a function of at least one of a speed of the motor vehicle or a speed of the other vehicle.

8. The method according to claim 1, wherein the visual range is at least partially derived from map data that is part of the environment data.

9. The method according to claim 8, wherein the visual range is at least partially derived from at least one of height data or slope data, which are part of the map data, and wherein a restriction of the visual range is determined by a vertical course of a road traveled by the motor vehicle.

10. The method according to claim 1, the intention of the driver to overtake the other vehicle is determined by at least one of setting a turn signal or an interior camera of the motor vehicle.

11. The method according to claim 10, wherein the interior camera of the motor vehicle is configured to recognize a shoulder glance.

12. A motor vehicle, comprising:
a driver assistance system configured to assist during an overtaking operation, the driver assistance system comprising:
a first determination device configured to determine vehicle data relating to a movement of the motor vehicle;
a second determination device configured to determine an intention of a driver of the motor vehicle to overtake another vehicle based on the vehicle data;
a position determination device configured to determine a position of the motor vehicle;
a computing unit configured to provide environment data for the position of the motor vehicle, wherein the environment data relate to stationary objects in an environment of the motor vehicle, and for deriving a visual range from the environment data; and
a headlight configured to project a warning onto a roadway region in the environment and to illuminate an overtaking lane,
wherein the computing unit is configured to either project the warning or illuminate the overtaking lane depending on the visual range in response to determining the intention of the driver to overtake the other vehicle,
wherein the computing unit is configured to project the warning onto the roadway region in response to the visual range being smaller than a visual limit value, and
wherein the computing unit is configured to illuminate the overtaking lane in response to the visual range being greater than the visual limit value.

13. A system configured to assist during an overtaking operation, the system comprising:
a vehicle-external server device;
a motor vehicle, comprising:
a first determination device configured to determine vehicle data relating to a movement of the motor vehicle;
a second determination device configured to determine an intention of a driver of the motor vehicle to overtake another vehicle based on the vehicle data;
a positioning unit configured to determine a position of the motor vehicle; and
a headlight configured to project a warning onto a roadway region in an environment of the motor vehicle and to illuminate an overtaking lane; and
a computing unit of the motor vehicle or the vehicle-external server device configured to provide environment data for the position of the motor vehicle, wherein the environment data relate to stationary objects in the environment of the motor vehicle, and configured to derive a visual range from the environment data in response to determining the intention of the driver to overtake the other vehicle,
wherein the computing unit is further configured to:
project the warning onto the roadway region in response to the visual range being smaller than a visual limit value; and
illuminate the overtaking lane in response to the visual range being greater than the visual limit value.

* * * * *